United States Patent
Griffith et al.

(10) Patent No.: US 10,546,144 B2
(45) Date of Patent: Jan. 28, 2020

(54) DYNAMICALLY EXCLUDING SENSITIVE INFORMATION FROM SYSTEM SNAPSHOT

(71) Applicant: INTERNATIONAL BUSINESS MACHINES CORPORATION, Armonk, NY (US)

(72) Inventors: Douglas J. Griffith, Austin, TX (US); Sreenivas Makineedi, Round Rock, TX (US); Robert S. Manning, Austin, TX (US); Srinivasa M. Raghavan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 15/146,922

(22) Filed: May 5, 2016

(65) Prior Publication Data

US 2017/0323110 A1 Nov. 9, 2017

(51) Int. Cl.
*G06F 21/62* (2013.01)
*G06F 11/36* (2006.01)

(52) U.S. Cl.
CPC ........ *G06F 21/6218* (2013.01); *G06F 11/366* (2013.01)

(58) Field of Classification Search
CPC .................................................. G06F 11/366
USPC ......................................................... 726/26
See application file for complete search history.

(56) References Cited

U.S. PATENT DOCUMENTS

| | | | |
|---|---|---|---|
| 7,380,171 B2 | 5/2008 | Prescott et al. | |
| 7,484,060 B2 | 1/2009 | Kelly et al. | |
| 7,770,056 B2 | 8/2010 | Malaviya | |
| 7,979,870 B1 * | 7/2011 | Pulsipher | H04L 29/08648 709/201 |
| 8,510,523 B2 | 8/2013 | Szegedi et al. | |
| 9,116,848 B1 * | 8/2015 | Jordan | G06F 11/1453 |
| 9,892,256 B1 * | 2/2018 | Lango | G06F 21/554 |
| 2006/0075200 A1 * | 4/2006 | Satoyama | G06F 11/1435 711/162 |

(Continued)

OTHER PUBLICATIONS

Authors et. al.: Disclosed Anonymously, "Method to Generate Declassified Dump File using Source Code Annotations," IP.com, IPCOM000235867D, Mar. 28, 2014, pp. 1-3.

(Continued)

*Primary Examiner* — Peter C Shaw
(74) *Attorney, Agent, or Firm* — Cantor Colburn LLP; David Quinn (57) ABSTRACT

Technical solutions are described for generating a secured system snapshot of a system. An example computer-implemented method includes receiving an instruction to generate a system snapshot. The system snapshot captures data from a computer executable object loaded in a memory. The method also includes accessing metadata that is associated with the computer executable object from a mapping list. The method also includes capturing the secured system snapshot by. Capturing the secured system snapshot includes determining sensitivity of the computer executable object by comparing the metadata with a predetermined criteria, and excluding a capture of sensitive data from the computer executable object into the system snapshot in response to the metadata of the computer executable object matching the predetermined criteria. The method also includes storing the secured system snapshot.

18 Claims, 7 Drawing Sheets

(56) References Cited

U.S. PATENT DOCUMENTS

| | | | | |
|---|---|---|---|---|
| 2012/0255013 A1* | 10/2012 | Sallam | ................. | G06F 21/554 |
| | | | | 726/24 |
| 2013/0067178 A1* | 3/2013 | Szegedi | .............. | G06F 11/0778 |
| | | | | 711/155 |
| 2014/0095821 A1* | 4/2014 | Yang | ...................... | G06F 21/53 |
| | | | | 711/162 |
| 2014/0359144 A1* | 12/2014 | Kruse | ............... | H04L 29/06197 |
| | | | | 709/228 |
| 2015/0113240 A1* | 4/2015 | Abrams | .............. | G06F 12/1458 |
| | | | | 711/163 |
| 2015/0113242 A1 | 4/2015 | Abrams et al. | | |
| 2017/0293754 A1* | 10/2017 | Jung | ...................... | G06F 21/52 |

OTHER PUBLICATIONS

Gondi et al., "SWIPE: Eager Erasure of Sensitive Data in Large Scale Systems Software," CODASPY'12, ACM 2012, pp. 295-306.

Grekhov et al., "On Reducing of Core Dump File Size," IEEE, 2009, pp. 1291-1295.

\* cited by examiner

```
# ls /etc/sc/current
class
rules
```

```
# cat class
MyApp:Global variable data = no
      Heap Memory = no
      Stack = yes
         Stack Registers = yes
         Stack Locals = no DB2:  Global variable data = yes
      Heap Memory = no
      Stack = yes
         Stack Registers = yes
         Stack Locals = no System:

Global variable data = yes
      Heap Memory = yes
      Stack = yes
         Stack Registers = yes
         Stack Locals = yes Default:
      Global variable data = yes
      Heap Memory = yes
      Stack = yes
         Stack Registers = yes
         Stack Locals = yes
```

⎫
⎬  Object List 310
⎭

```
# cat rules
* class resvd user group application type tag
MyApp   -    -    -     -          /opt/myapp/*    -
DB2     -    -    -     -          /opt/db2/*      -
System  -    -    -     -          /usr/sbin/*     -
Default -    -    -     -          /usr/bin/*      -
Default -    -    -     -          /usr/lib/*      -
```

⎫
⎬  Mapping List 320
⎭

Secure System Snapshot Configuration 300

| ADDRESS | MEMORY SIZE | TYPE | CALLER | OBJECT TYPE |
|---|---|---|---|---|
| 10000000 | 232K | read/exec | ksh | MyApp |
| 20000ef8 | 54K | read/write | ksh | MyApp |
| d0085100 | 80K | read/exec | /usr/lib/libiconv.a[shr4.o] | Default |
| f03e4670 | 41K | read/write | /usr/lib/libiconv.a[shr4.o] | MyApp |
| d0080100 | 40K | read/exec | /usr/lib/libi18n.a[shr.o] | MyApp |
| f03f0b78 | 4K | read/write | /usr/lib/libi18n.a[shr.o] | Default |
| d007a000 | 11K | read/exec | /usr/lib/nls/loc/en_US | Default |
| d007d130 | 8K | read/write | /usr/lib/libcrypt.a[shr.o] | Default |
| d0079048 | 2K | read/exec | /usr/lib/libcrypt.a[shr.o] | MyApp |
| f03e3508 | 0K | read/write | /usr/lib/libc.a[shr.o] | MyApp |
| d02156c0 | 2282K | read/exec | /usr/lib/libc.a[shr.o] | Default |
| f03474e0 | 621K | read/write | /usr/lib/libc.a[shr.o] | Default |

Mapping List 320

DYNAMICALLY EXCLUDING SENSITIVE INFORMATION FROM SYSTEM SNAPSHOT

BACKGROUND

The present application relates to computer technology, and more specifically, to improving a computer system by improving the security of a system snapshot, which may contain system diagnostic information in case of a system error, by dynamically limiting the diagnostic information being collected.

In a computer system, when an operating system encounters a failure, such as a failure that causes the system to restart, it is desirable to collect diagnostic information on the state of the system and the steps that caused the failure to occur. Accordingly, in the case of a failure, the system captures a dump, which is a snapshot of the virtual and/or real storage of the system. The captured snapshot contains information to diagnose the problem that caused the failure, which may include sensitive information, such as health information, financial information, or other types of sensitive information or a combination thereof.

SUMMARY

According to an embodiment, a computer implemented method for generating a secured system snapshot of a system includes receiving an instruction to generate a system snapshot. The system snapshot captures data from a computer executable object loaded in a memory. The method also includes accessing metadata that is associated with the computer executable object from a mapping list. The method also includes capturing the secured system snapshot. Capturing the secured system snapshot includes determining sensitivity of the computer executable object by comparing the metadata with a predetermined criteria and excluding a capture of sensitive data from the computer executable object into the system snapshot in response to the metadata of the computer executable object matching the predetermined criteria. The computer implemented method also includes storing the secured system snapshot.

According to another embodiment, a computer program product for generating a secured system snapshot of a system includes a computer readable storage medium, which includes computer executable instructions to receive an instruction to generate a system snapshot. The system snapshot captures data from a computer executable object loaded in a memory. The computer readable storage medium also includes computer executable instructions to access metadata that is associated with the computer executable object from a mapping list. The computer readable storage medium also includes computer executable instructions to capture the secured system snapshot. Capturing the secured system snapshot includes determining sensitivity of the computer executable object by comparing the metadata with a predetermined criteria. Capturing the secured system snapshot also includes excluding a capture of sensitive data from the computer executable object into the system snapshot in response to the metadata of the computer executable object matching the predetermined criteria. The computer readable storage medium also includes computer executable instructions to store the secured system snapshot.

According to another embodiment, a system for generating a secured system snapshot of a system includes a memory, and a processor communicatively coupled with the memory. The processor is configured to execute an operating system that is configured to receive an instruction to generate a system snapshot, where the system snapshot captures data from a computer executable object loaded in a memory. The processor is configured to access metadata that is associated with the computer executable object from a mapping list. The processor is also configured to capture the secured system snapshot, where capturing includes determining sensitivity of the computer executable object by comparing the metadata with a predetermined criteria. The capturing of the secured system snapshot also includes excluding a capture of sensitive data from the computer executable object into the system snapshot in response to the metadata of the computer executable object matching the predetermined criteria. The processor is also configured to store the secured system snapshot.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed herein are technical solutions for facilitating a computer system to improve capturing a snapshot of diagnostic information in case of a failure, which may cause the system to restart. As such the technical solutions are rooted in and/or tied to computer technology in order to overcome a problem specifically arising in the realm of computers, specifically operating systems.

Typically, capturing a dump of a computer system, which is the snapshot of the diagnostic information, is a time consuming and resource intensive operation. To capture the dump, the computer system identifies and captures relevant data in real memory and/or virtual memory and writes the information to storage, such as an internal or an external storage. For example, the dump may include a process's virtual address space or the complete system address space. The storage may be a Flash-based storage drive or a disk such as a holographic storage, a hard disk drive, a solid-state drive, or any other type of a storage disk or drive, or a combination thereof. The computer system preserves the captured dump for analytical purposes after the computer system restarts or resumes. The captured dump includes control structures and system state information that are used to reconstruct the environment at the time of the error. For example, the dump data includes data from monitoring the address space, memory, and registers, which change rapidly. In addition, the captured dump includes relevant data in virtual memory that has been paged out to an external storage medium. To capture the data in the virtual memory, the system reads in the paged-out data into real memory (which causes the pages occupying those real frames to be paged out), and then writes those pages to the dump.

Thus, the data captured in the system snapshot may include entire contents of the memory of the computer system at the time of failure. Such contents may include sensitive information, such as personal data that an application may be operating on at the time of, or prior to the occurrence of the system failure. Alternatively or in addition, the sensitive data may be part of the data that the application is about to operate on. Additionally or alternatively, the system snapshot may include data stack of two or more applications. Thus, if a first application causes the system failure, sending the resulting system snapshot to a vendor of the first application may not be safe as the system snapshot may include sensitive information associated with a second application. As the number of vendors associated with a user's software stack increases and as the vendors become more removed from one another, capturing and transmitting the captured system snapshot to the vendors for debugging an error in their respective software applications may result in sharing of sensitive information from one application to another. Accordingly, the technical solutions described herein facilitate prevention of sharing user program data that might be obtained via the system snapshot (a core dump).

For example, the system snapshot may contain, among other data, a process private information (for example, a u-block in IBM® Z/OS®), loader information and address space mappings, global parameters initialized by an application, heap and/or stack memory(ies), global parameters initialized per library, shared memory, and mapped memory. The mapped memory includes regions of memory of the computer system that a process can access although the mapped memory is outside of the process's address space, for example by directly incorporating file data into the process address space. The system snapshot may further include basic subsystem (BSS) for a.out, and BSS per library loaded in the memory of the computer system.

In the case of a failure caused by a software, depending on the layer at which the software is operating, the entirety of the data captured in a resulting system snapshot may include information not be used by the software vendor for debugging a cause of the failure. Further, the system snapshot may include sensitive information, such as data from another software application concurrently executing on the computer system. Alternatively or in addition, the sensitive information may be data being used by a library or any other object in the memory of the computer system. For example, an operating system of the computer system may load the library and/or object in the memory, such as at startup of the operating system, or at startup of an application software or process. The failure may be debugged without the sensitive information. For example, a problem determination (PD) data for a problem with the operating system, may only include data relevant to system calls and the libraries provided by the operating system. For example, in another scenario, a PD data for a problem with a first application may only include data relevant to objects and/or library calls executed by the first application, which may be located in regions of memory associated with the first application (and not with a second application). In yet another example scenario, the first application may use a third party library to process sensitive data, and thus, a vendor of the first application, to debug the failure, may not want the sensitive information from the third party library, but might want the information about the function calls (that is computer executable instructions) from the library. Thus, the vendor may want partial data from the third party library, for example, excluding sensitive information resident in the application.

Additionally or alternatively, the technical solutions described herein facilitate the software application vendor to subdivide the data in the library space. Accordingly, the vendor can forward data associated with a first library to a respective library vendor, or a respective debugger, after narrowing the failure being caused by the first library. The technical solutions described herein ensure that the data forwarded excludes any sensitive information. To such ends, the technical solutions described herein facilitates dynamically classifying the data captured by the system snapshot and filter the sensitive portions of the data at the time of the system snapshot, such that only the PD data used for debugging by the vendor is captured, without any sensitive information.

Figure 1:
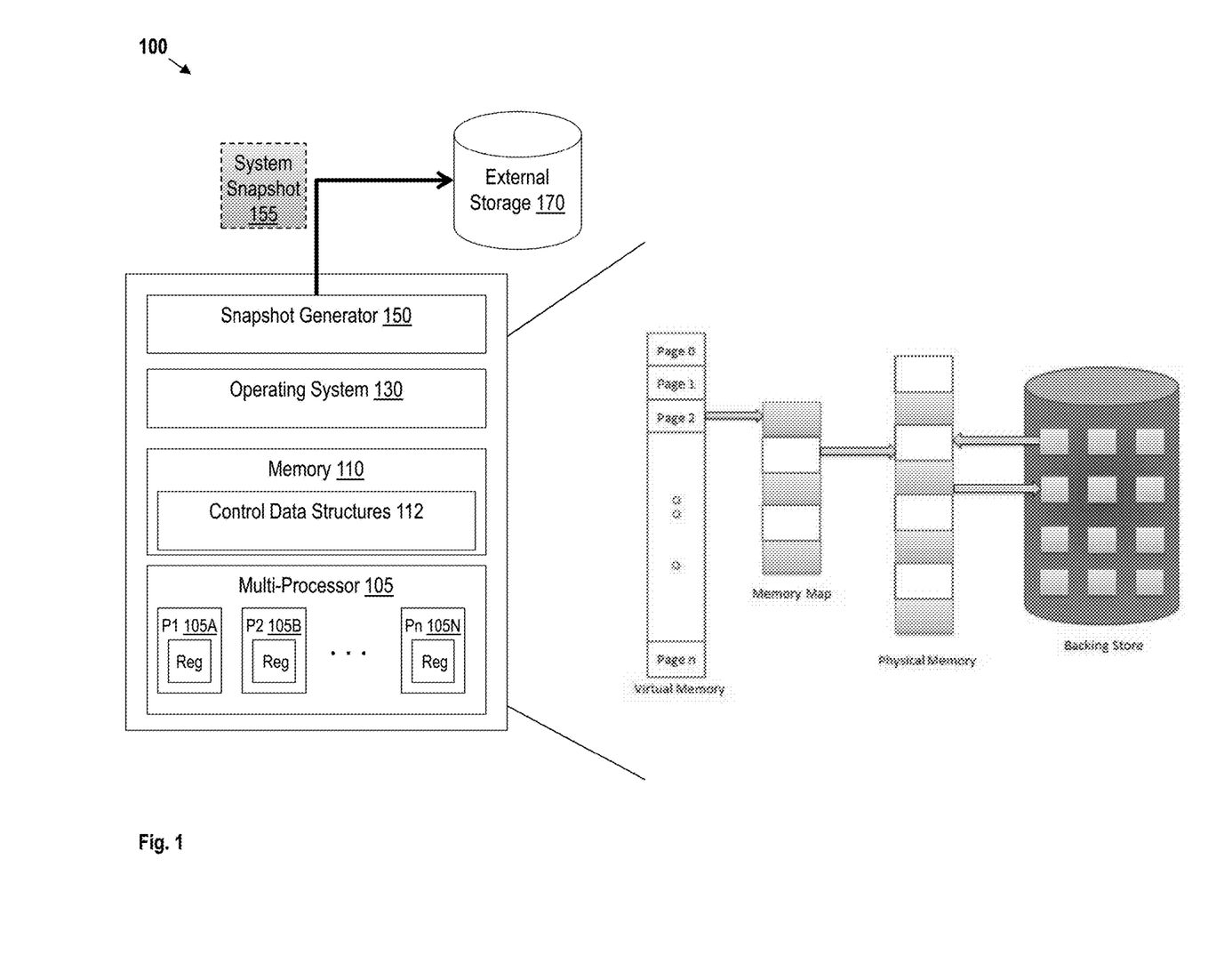
FIG. 1 illustrates an example system for dynamically excluding sensitive information from system snapshot in accordance with an embodiment.

FIG. 1 illustrates an example computer system that uses the technical solutions described herein. The computer system 100 includes, among other components, a processor 105, a memory 110, an operating system 130, and a snapshot generator 150. The snapshot generator 150 stores a snapshot 155 to an external storage 170. While the snapshot generator 150 is illustrated as a separate component in FIG. 1, in some example, the snapshot generator 150 may be part of the operating system 130.

The processor 105 is a central processor of the system 100, and is responsible for execution of the operating system 130, the applications, and any other executable instructions. The processor 105 is operable to execute logic. The logic includes computer executable instructions or computer code embodied in the memory 110 or in other memory that when executed by the processor 105, cause the processor 105 to perform the features implemented by the logic. The computer code includes instructions executable with the processor 105. The computer code may include embedded logic. The computer code may be written in any computer language now known or later discovered, such as C++, C#, Java, Pascal, Visual Basic, Perl, HyperText Markup Language (HTML), JavaScript, assembly language, shell script, PL/X, zTT, REXX, or any combination thereof. The computer code may include source code and/or compiled code. The processor 105 may be a general processor, a Central Processing Unit (CPU), a server, an Application Specific Integrated Circuit (ASIC), a Digital Signal Processor (DSP), a Field Programmable Gate Array (FPGA), a digital circuit, an analog circuit, a multi-processor, or combinations thereof. The processor 105 is in communication with the memory 110, the operating system 130, and other components of the system 100. The processor 105 includes registers that contain data that is being used for operation of the system 100. If the processor 105 is a multi-processor that includes multiple processors 105A-105N, each of the processors has respective register sets. For example, registers may contain the address of an instruction that the processor is currently executing, a next instruction in the queue, data that the executing instruction is operating on, and other such operational data.

The memory 110 includes non-transitory computer readable storage medium. The memory 110 stores control instructions and data of the operating system 130 and other applications that are executable by the processor 105. In addition, the memory 110 may contain other data such as images, videos, documents, spreadsheets, audio files, and other data that may be associated with the operation of the system 100. For example, the memory 110 includes control data structures 112. The control data structures 112 include data associated with the current operations being performed by the operating system 130. For example, the control data structures may contain page tables that represent associations between virtual memory and real memory, data identifying a current state of the applications, user interface information, and other information useful to for operation of the system 100. The control data structures 112, thus include, the current state of the operating system 130 and one or more applications that the system 100 is executing. The memory 110 includes primary memory, which is volatile memory such as dynamic random-access memory (DRAM), static random-access memory (SRAM), or any other type of volatile memory or a combination thereof. The memory 110 also includes secondary memory, which is non-volatile memory such as hard disks, magnetic tape, flash memory, or any other type of non-volatile memory or combination thereof. The memory 110 may include data (including the sensitive information) used by the operating system 130 and/or the one or more applications that the system 100 is executing.

The operating system 130 is responsible for managing the operations of the system 100. The operating system 130 may be any operating system such as z/OS®, WINDOWS®, LINUX®, OS/X®, or any other operating system. For example, the operating system 130 allocates a virtual address space from a virtual storage to an application. The virtual storage is the span of memory addresses available to the processor with a dynamic address translation (DAT) feature enabled. The operating system 130 is responsible for maintaining the control data structures 112 in the memory 110.

The snapshot generator 150 facilitates the operating system 130 to capture the snapshot 155 and store the snapshot 155 onto the external storage 170. The snapshot generator 150 may be an internal processor, a co-processor, a hardware accelerator, a VM, or a distributed node. In other examples, the snapshot accelerator 150 may be hardware such as electronic circuitry, for example, an ASIC, an FPGA, a DSP, a graphics processing unit (GPU), or any other digital or analog circuitry. The snapshot generator 150 may additionally or alternatively include computer executable instructions, and be part of the operating system 130.

The snapshot 155 is a system image of the system 100 and contains diagnostic information that the operating system 130, a system technician, a vendor, or any other entity may use to determine a cause of the system failure. For example, the diagnostic information contains state of the registers of the processor(s) 105, the control data structures 112, and any other data that the operating system 130 marks for storage within the snapshot 155.

The external storage 170 stores the system snapshot 155. The external storage 170 may also store deltas between the snapshot 155 and an active state of the system 100. The external storage 170, although is illustrated as being outside a physical boundary of the system 100, in an example, the external storage 170 may be physically within the system 100. The external storage 170 may be a non-volatile storage disk such as a flash disk, a holographic storage, a hard disk drive, a solid-state drive, or any other type of a storage disk or a combination thereof.

Figure 2:
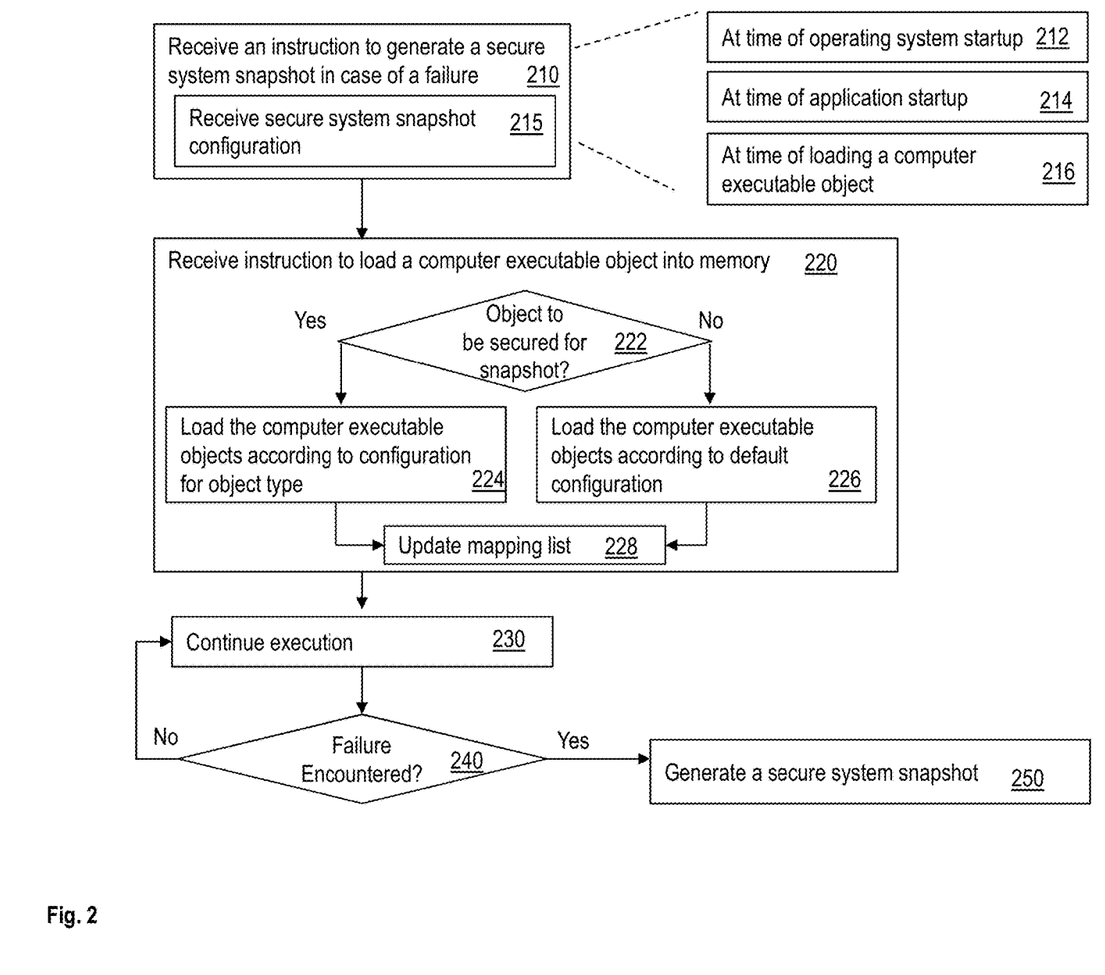
FIG. 2 illustrates a flowchart of an example method for generating a secure system snapshot in accordance with an embodiment.

FIG. 2 illustrates a flowchart of an example method for generating a secure system snapshot. A 'secure snapshot' is a system snapshot that excludes (or does not contain) sensitive information from the computer executable objects loaded into the memory 110. In that regard, a system snapshot that captures the entirety of the memory contents of the system 100 is an insecure or a non-secure system snapshot, as it does not filter the sensitive information that may be contained in the computer executable objects loaded into the memory 110. The method may be implemented by the computer system 100, such as by the processor 105 via the operating system 130. For example, the system 100 receives an instruction to generate a secure system snapshot in case of a failure, as shown at block 210. For example, a user such as an administrator, initiates the secure system snapshot at the time of startup of the operating system 130, as shown at block 212. For example, the instruction may be in the form of configuring a system environment variable, such as LDR_CNTRL=SECURE_CORE. The system environment variable may configure a loader of the operating system 130 to secure computer executable objects that the loader loads in the memory 110 of the system 100. The loader may be part of the operating system 130 that is responsible for loading application software and libraries into the memory 110. For example, loading a software application includes reading contents of a data structure, such as a file containing corresponding program instructions into the memory 110, and carrying out preparatory tasks for running the software application. Once loading is complete, the operating system 130 starts the software application by passing control to the loaded program code.

Alternatively or in addition, the processor 105 receives the instruction on startup of a software application, as shown at block 214. For example, the system environment variable may be setup to generate the secure system snapshot at the time the software application is initiated for execution. Alternatively or in addition, the processor 105 receives the instruction at the time the loader is loading a specific computer executable object into the memory 110, as shown at block 216. For example, the computer executable object may be a data structure, such as a class, a table, a column, or any other collection of data used by a software application during execution. The computer executable object may further include computer executable instructions, such as a function. The loader loads the computer executable object by reading the computer executable instructions of the object and allocating a memory location to the object. The computer executable object may be a part of computer executable instructions of the software application or a part of computer executable instructions of a third party library that the software application invokes.

Figure 3:
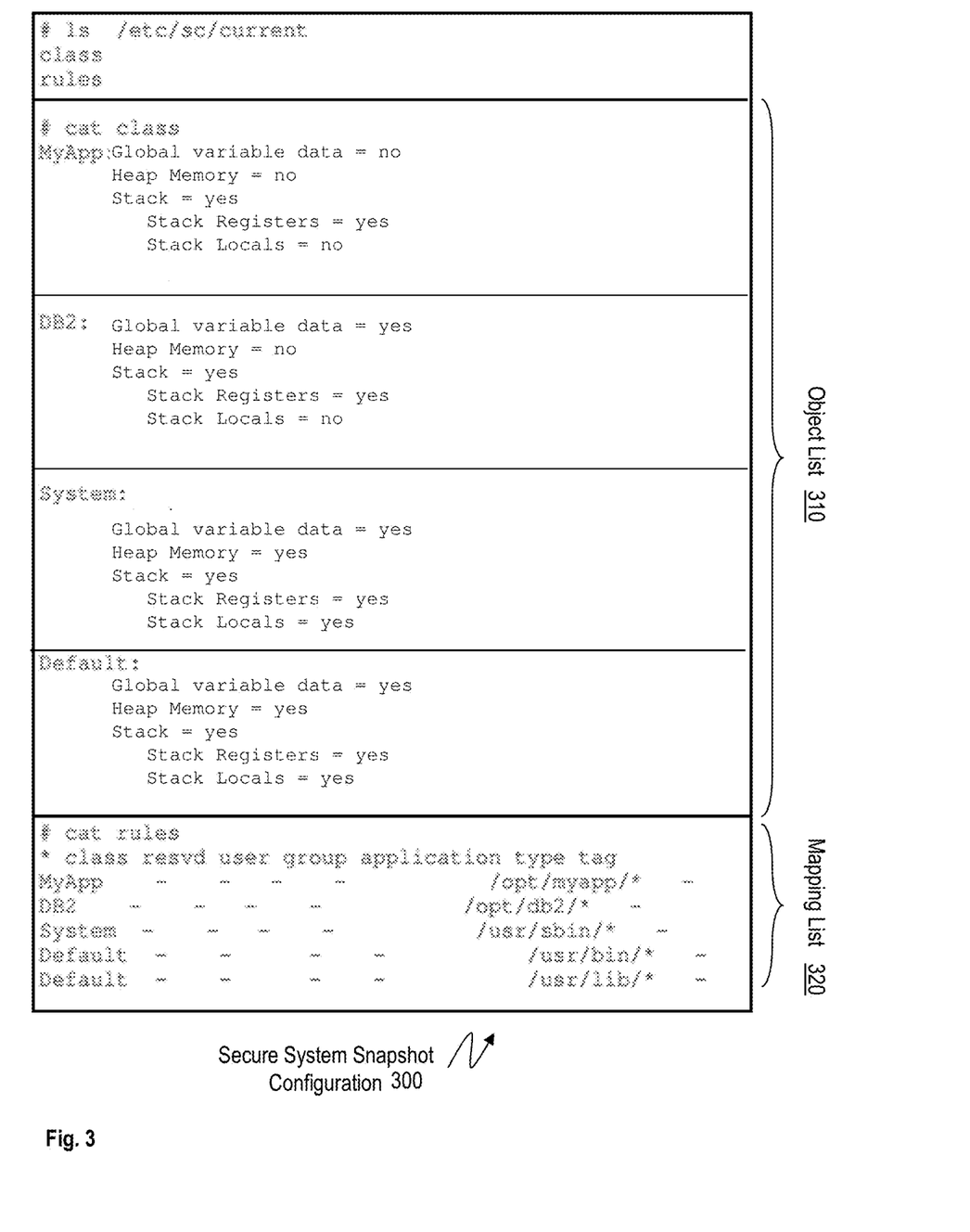
FIG. 3 illustrates an example secure system snapshot configuration

Additionally, when receiving the instruction to secure the system snapshot 155, the processor 105 may receive a secure system snapshot configuration, as shown at block 215. FIG. 3 illustrates an example secure system snapshot configuration 300. The secure system snapshot configuration 300, among other components, includes an object list 310 and a mapping list 320. The secure system snapshot configuration 300 is a data structure, such as a file, that the processor 105 loads into the memory for reference when loading one or more computer executable objects into the memory 110 in response to the receipt of the instruction to secure the system snapshot 155.

For example, the object list 310 includes a list of predetermined computer executable objects to be secured in case of a failure that causes the system snapshot 155 to be generated. For example, the secure system snapshot configuration 300 identifies whether to filter specific types of data of each computer executable object in the object list 310. For example, in the illustrated case of FIG. 3, by default (Default object), the system snapshot 155 includes each type of data associated with the object. The types of data may include data stored in stack memory, data stored in heap memory, data stored in global variables, among other types of data. The secure system snapshot configuration 300 may provide further control over filtering the data from the specific type of data. For example, the secure system snapshot configuration 300 may identify subtypes of a specific data type to be stored in the system snapshot 155. For example, as illustrated in FIG. 3, the object list 310 further identifies that for data stored by an object in a corresponding stack memory, whether data stored in stack registers and/or data stored in stack variables are to be captured in the system snapshot 155.

Different computer executable objects identified by the object list 310 may have a distinct system snapshot configuration, respectively. For example, as illustrated in FIG. 3, an object of type MyApp excludes data from heap memory and global variables (=yes in FIG. 3) from the system snapshot 155. Additionally, a MyApp object partially excludes data from the stack memory, by excluding local variables (=no in FIG. 3) stored in the stack memory, but including values stored in stack registers (=yes in FIG. 3). Of course, it is understood that the object list 310 may specify the data that is to be excluded from the system snapshot 155 in a different format, such only specifying types of data to be included, or only specifying types of data types to be excluded, and so on.

The types of data that are excluded may contain sensitive information being processed by the computer executable objects, and thus, by excluding the specific types of data, the sensitive information is excluded from the system snapshot 155. The different types of data are accordingly specified by the type of storage (or type of memory) used to store the data, for example, stack memory, heap memory, global memory, among other types of storage.

Further, as illustrated in FIG. 3, each computer executable object in the object list 310 specifies a respective configuration for the types of data to be excluded from the system snapshot 155. For example, the DB2 object in FIG. 3 excludes the global variables, while the MyApp object does not exclude corresponding global variables. Thus, as illustrated in FIG. 3, the object list 310 specifies types of data within the specific computer executable objects that are to be excluded from the system snapshot 155 to secure the system snapshot. Each object in the object list 310 may have a distinct configuration.

Further, referring to FIG. 3, the mapping list 320 includes metadata associated with the computer executable objects loaded into the memory 110.

For example, the mapping list 320 may include a type of the computer executable object (for example, type of data structure), an identity of a user or a group that initiated loading the computer executable object, a type of the software application that initiated the loading, a tag associated with the computer executable object, among others and a combination thereof. Thus, in an example, such as the one illustrated in FIG. 3, the mapping list 320 includes a mapping between a computer executable object loaded into the memory 110 and a path from which the object was loaded. For example, the illustrated mapping list 320 specifies that a computer executable object of the configuration DB2 was loaded from the path/opt/db2/*. Of course, the mapping list 320 may specify the mapping in any other way than the tabular format illustrated in FIG. 3. Further, the mapping list 320 may store other types of metadata of the computer executable objects loaded in the memory 110 than the types listed above.

Figure 4:
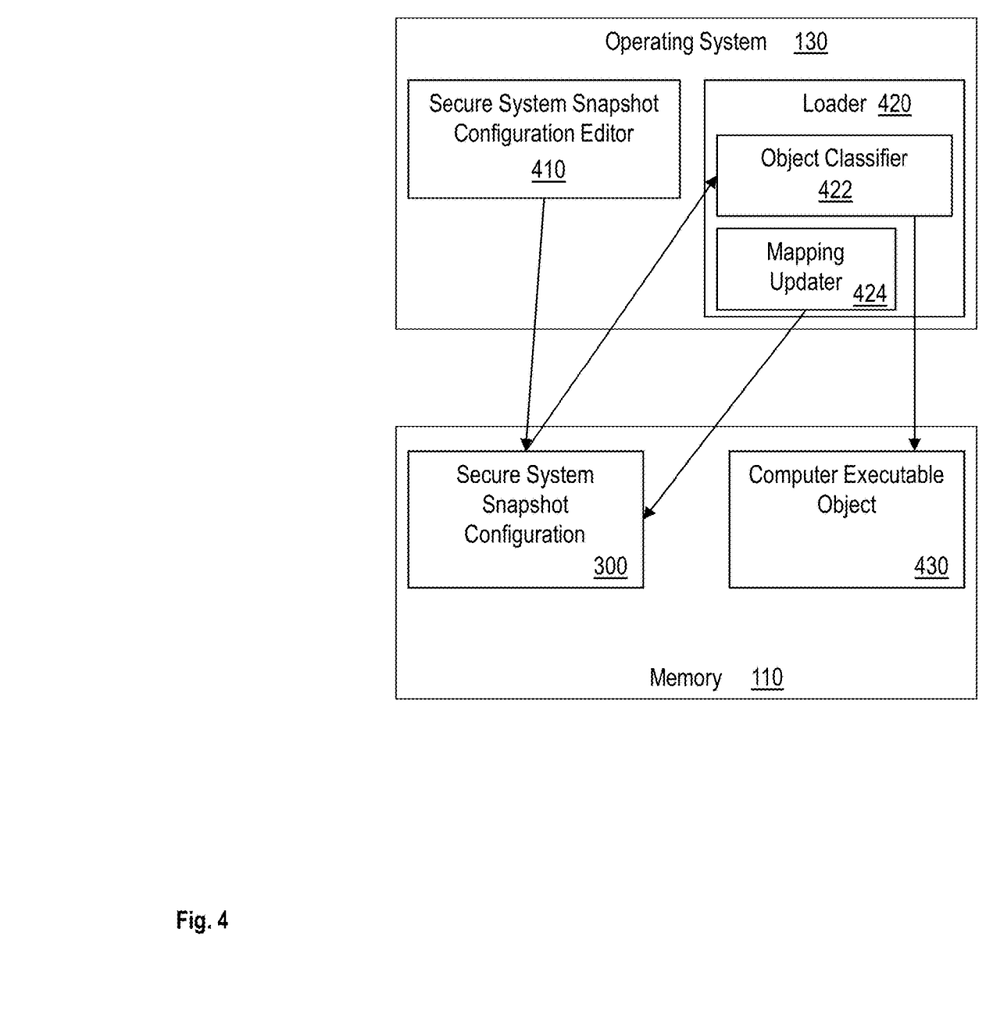
FIG. 4 illustrates example components of an operating system that dynamically excluding sensitive information from system snapshot in accordance with an embodiment.

The operating system 130 may facilitate a user to setup/modify the secure system snapshot configuration 300. FIG. 4 illustrates example components of the operating system 130. For example, the operating system 130 may include a secure system snapshot configuration editor 410 and a loader 420.

The secure system snapshot configuration editor 410 facilitates the user to modify the secure system snapshot configuration 300, for example by editing the object list 310. For example, the user may create, or edit the secure system snapshot configuration 300 using a text editor, a user interface, via a command prompt, or in any other user interactive manner.

The loader 420 may include an object classifier 422 that accesses the secure system snapshot configuration 300 to classify a computer executable object 430 at the time the loader 420 is loading the computer executable object 430 into the memory 110. The loader 420 loads the computer executable object 430 into the memory 110 according to the secure system snapshot configuration 300. Accordingly, in the case of a failure, the snapshot generator 150 generates the system snapshot 155 excluding the data of the computer executable object 430, per the system snapshot configuration 300. The loader 420 may further include a mapping updater 424, which updates the mapping list 320 with the metadata associated with the respective computer executable objects that the loader 420 loads into the memory 110.

For example, returning to FIG. 2, the operating system 130 receives an instruction to load the computer executable object 430 into the memory 110, as shown at block 220. For example, the instruction may be in response to execution of a software application that uses the computer executable object 430. Alternatively or in addition, the instruction may be in response to a library that uses the computer executable object 430 being loaded into the memory 110. For example, a user may instruct the operating system 130 to execute the application software that uses the computer executable object 430 or the library that contains the computer executable object 430.

The loader 420, in response to the instruction, determines whether to secure the computer executable object 430 when loading the computer executable object 430, as shown at block 222. For example, the object classifier 422 accesses the object list 310 to determine if the computer executable object 430 is of the one or more types of objects in the object list 310. If the computer executable object 430 matches one of the objects from the object list 310, the loader 420 identifies the corresponding configuration and loads the computer executable object 430 into the memory 110 accordingly, as shown at block 224. For example, if the configuration of the computer executable object 430 specifies that heap memory is to be excluded from the system snapshot 155, the loader may allocate a separate heap memory for the computer executable object 430. Alternatively, if the heap memory is not to be excluded (that is the configuration allows the heap memory to be captured in the system snapshot), the loader 420 allocates heap memory for the computer executable object 430 from the heap memory assigned to a thread associated with the process that initiated the computer executable object 430. For example, the heap memory assigned to the thread may be identified according to a unique thread identifier (TID).

Alternatively, if the computer executable object 430 fails to match any of the specific types of computer executable objects from the object list 310, the loader 420 loads the computer executable object 430 using the default configuration, as shown at block 226.

Figure 5:
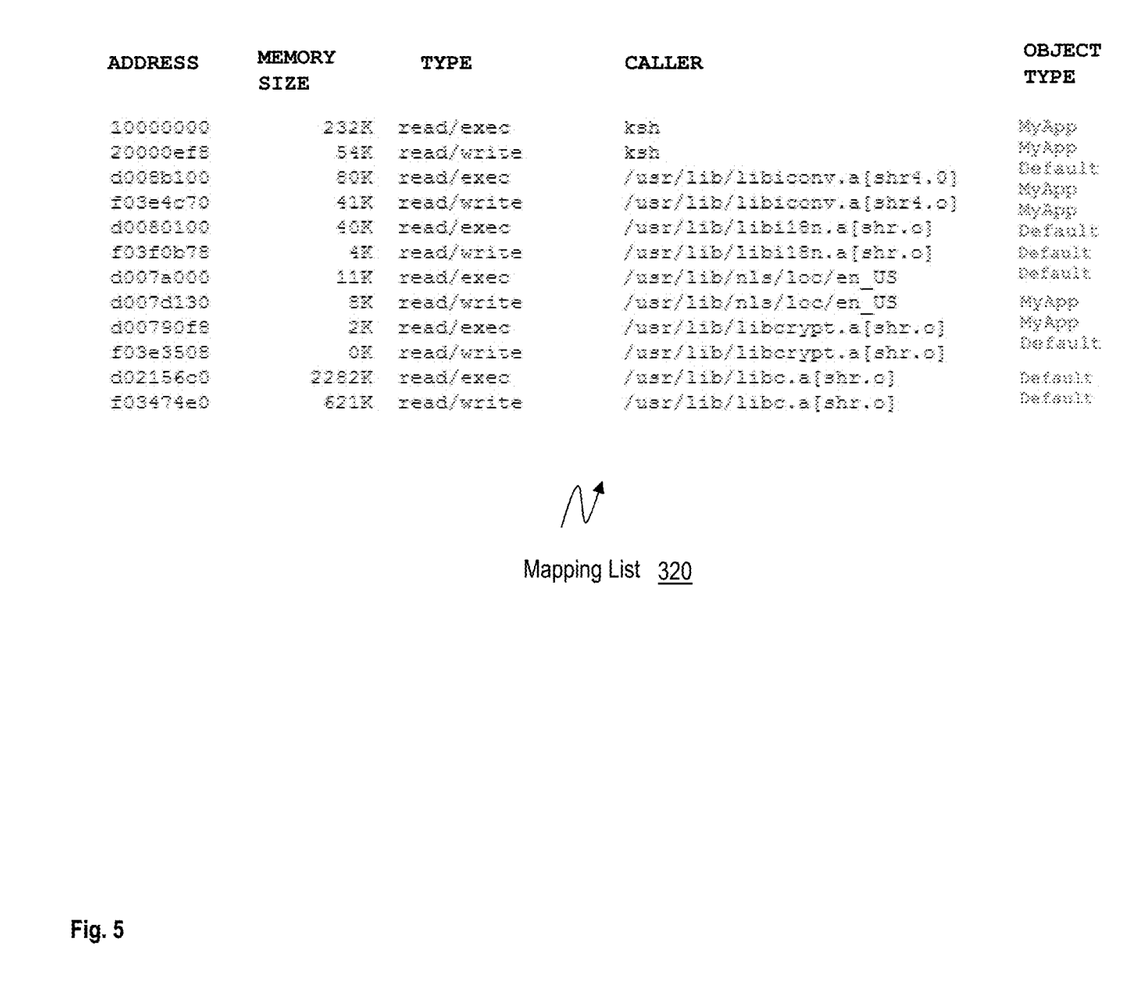
FIG. 5 illustrates an example updated mapping list.

Once the computer executable object 430 is loaded, the mapping updater 424 updates the mapping list 320, as shown at block 228. FIG. 5 illustrates an example updated mapping list 320.

The operating system 130 continues execution using the computer executable object 430, as shown at block 230. In case a failure is encountered that results in the system snapshot 155 to be generated, the snapshot generator 150 generates a secure system snapshot, as shown at blocks 240 and 250. Else, the execution continues if a failure is not encountered, as shown at blocks 240 and 230.

Figure 6:
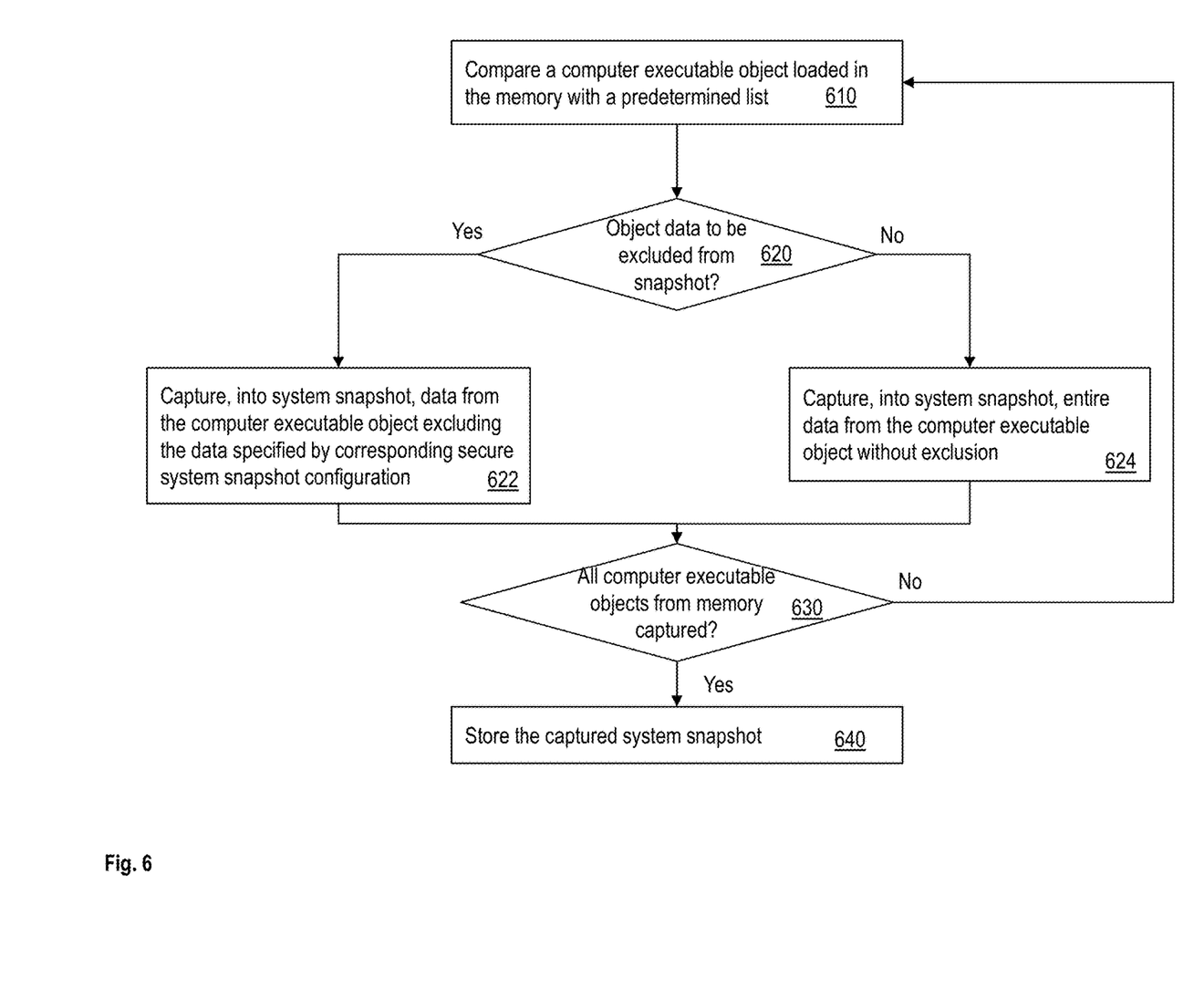
FIG. 6 illustrates a flowchart of an example method for generating a secure system snapshot in accordance with an embodiment.

FIG. 6 illustrates a flowchart of an example method for generating the secure system snapshot. The snapshot generator 150 receives an instruction to generate the system snapshot 155 in response to a failure encountered by the operating system 130. The snapshot generator 150 captures the data from each computer executable object loaded in the memory 110 in the system snapshot 155. The snapshot generator compares the computer executable object 430 loaded in the memory 110 with a predetermined list of objects that are to be further analyzed prior to capturing the object data into the system snapshot 155, as shown at block 610. The predetermined list, for example, is the object list 310. Alternatively or in addition, the predetermined list may be a separate list of metadata of computer executable objects, and the snapshot generator 150 compares the metadata of the computer executable object 430 with the predetermined list.

The predetermined list of metadata identifies a predetermined set of sensitive computer executable objects that are to be excluded or filtered from the system snapshot 155. The predetermined list may be stored in the memory 110 and accessed in response to receipt of the instruction to generate a secure system snapshot. For example, the predetermined list may specify that the computer executable object 430 loaded in response to actions, such as instructions to execute a software application, from a specific user (particular user-id), or group of users (particular group-id), contains sensitive information. Accordingly, the snapshot generator 150 processes the computer executable object 430 securely, to exclude the sensitive information from the system snapshot 155. Alternatively or in addition, the predetermined list identifies that the computer executable object 430 contains sensitive information based on the computer executable object 430 being loaded from one or more specific paths. Alternatively or in addition, the computer executable object 430 may be identified as to be secured based on a vendor of a library or application that loads the computer executable object 430.

Thus, the predetermined list may identify that the computer executable object 430 contains sensitive information based on one or more metadata fields. The snapshot generator 150 compares the metadata of the computer executable object 430, which is stored in the mapping list 320, with the predetermined list, to determine if the computer executable object 430 contains sensitive information that is to be excluded from the system snapshot 155.

Based on the comparison, the snapshot generator 150 determines whether the computer executable object 430 contains data to be excluded from the system snapshot 155, as shown at block 620. In case the computer executable object 430 contains sensitive information, the snapshot generator 150 captures, into the system snapshot 155, data from the computer executable object 430 excluding the data specified by corresponding secure system snapshot configuration in the object list 310, as shown at block 622. For example, if the corresponding configuration specifies that heap memory data is not to be captured in the system snapshot 155, the snapshot generator 150 filters the data of the computer executable object 430 by not capturing (that is excluding) the heap memory data of the computer executable object 430. Alternatively or in addition, the snapshot generator 150 may exclude global variable data of the computer executable object 430. Alternatively or in addition, the snapshot generator 150 may exclude entire or partial stack memory contents of the computer executable object 430. For example, based on the configuration, the snapshot generator 150 determines which, if any, subtype (stack locals, or stack registers) of the stack memory data of the computer executable object 430 is to be excluded. Thus, the snapshot generator 150 filters other types of data associated with the computer executable object 430, as specified in the corresponding configuration in the object list 310.

Alternatively, if the computer executable object 430 does not contain sensitive information based on the comparison with the predetermined list, the snapshot generator 150 captures, into system snapshot 155, entire data from the computer executable object 430 without exclusion, as shown at block 624. For example, the snapshot generator 150 captures entire contents of the data stack memory (including stack locals, stack registers), heap memory, and global variables of the computer executable object 430.

The snapshot generator 150 ensures that each computer executable object 430 loaded in the memory 110 is captured, entirely or partially, according to the corresponding configuration, as shown at blocks 630 and 610. Once each computer executable object 430 from the memory 110 has been processed, the system snapshot may be stored, such as in the external storage 170, as shown at block 640.

Thus, the technical solutions described herein facilitate generating a system snapshot that contains only filtered information or symbols from an object, based on the object's metadata, such as a callers' storage path, user-id, group-id, vendor, or any other metadata. For example, a user, such as a security or a system administrator configures a system to exclude sensitive information from a system snapshot, for example by configuring an environment variable like LDR_CNTRL. The environment variable may be updated at the time of starting an operating system, an application or loading a library into memory. At execution time, the loader of the operating system directs the allocation of computer executable objects in a secure manner, such as by allocating a secure heap memory. The loader additionally maintains a mapping list, which maintains metadata associated with the computer executable objects loaded into the memory. When a system failure occurs, such as an application fault, a system snapshot generator accesses a secure system snapshot configuration in effect at that time and either captures entire data of a computer executable object in the memory or a partial snapshot by excluding sensitive data from the computer executable object according to the configuration.

Figure 7:
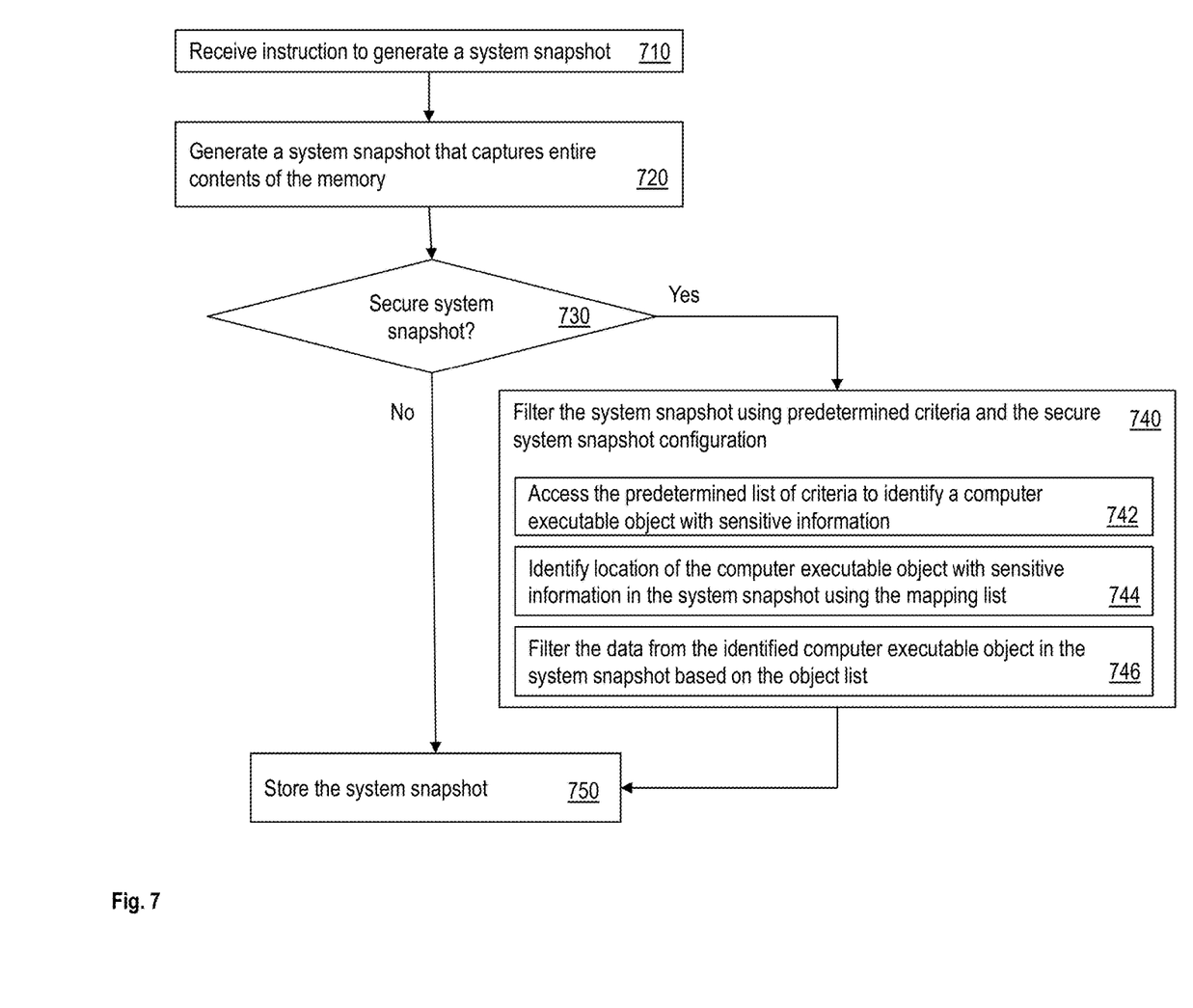
FIG. 7 illustrates a flowchart of an example method generating a secure system snapshot.

In another embodiment, the snapshot generator 150 generates a secure system snapshot using a method illustrated by an example flowchart in FIG. 7. The snapshot generator 150 receives an instruction to generate the system snapshot 155, as shown at block 710. Accordingly, the snapshot generator 150 generates the system snapshot 155 that captures entire contents of the memory 110, which includes entire data of each computer executable object 430 loaded in the memory 110, as shown at block 720. The snapshot generator 150 checks if the system snapshot 155 is to be secured, as shown at block 730. For example, the snapshot generator 150 determines if the system snapshot 155 is to be secured by checking one or more environment variables, such as the LDR_CNTRL.

In case the system snapshot 155 is to be secured, the snapshot generator 150 filters the system snapshot 155 based on the predetermined list, the mapping list 320, and according to the object list 310, as shown at block 740. For example, the snapshot generator 150 accesses the predetermined list to identify the criteria to exclude computer executable objects based on the metadata of the computer executable objects, as shown at block 742. Thus, the snapshot generator 150 identifies the computer executable object 430 with sensitive information, as shown at block 744. Further, the snapshot generator 150 identifies a location of the computer executable object 430 with sensitive information in the system snapshot 155 using the mapping list 320, as shown at block 744. The mapping list 320 contains the metadata of the computer executable object 430, such as a memory address, among other metadata fields, to identify the computer executable object 430. The snapshot generator 150 further proceeds to filter the data from the identified computer executable object 430 in the system snapshot 155 based on the object list 310, as shown at block 746.

For example, the snapshot generator 150 identifies the corresponding secure system configuration of the computer executable object 430 from the object list 310, and deletes the data to be excluded according to the configuration. For example, if the corresponding configuration specifies that in the secure mode, the stack memory contents are to be excluded from the system snapshot 155, the snapshot generator 150 deletes the stack memory contents of the computer executable object 430 from the system snapshot 150. Alternatively or in addition, the snapshot generator 150 filters other types of data of the computer executable object 430 from the system snapshot, such as the heap memory, global variable data, as well as subtypes of the stack memory, such as the stack register data, and the stack local variable data. Thus, the snapshot generator 150 excludes any sensitive information from the system snapshot 155.

The snapshot generator subsequently stores the system snapshot 155 that was captured, as shown at block 750. Thus, in case the system snapshot is secured, according to the environment variables, a filtered version of the system snapshot is stored. Alternatively, the entire contents of the system snapshot 155 are stored.

Thus, the technical solutions described herein facilitate protecting sensitive information to be captured in a system snapshot, such as when a core-dump analysis is requested by vendors or partners. The technical solutions, thus, improve security of computer systems, since, although Health Insurance Portability and Accountability Act (HIPAA) or other security compliant software applications and tools facilitate securing data being used by the software application during execution, such software applications cannot control the diagnostic information that is captured by an operating system in case of failures. The technical solutions described herein may be implemented by the operating system itself, thus preventing a compromise of the protection of the sensitive information. The technical solutions facilitate such improved protection by including a classification system, which may be integrated in a loader of the operating system, that maintains a computer executable object (such as class) mappings to each loaded library and a.out, in certain operating systems. The mapping includes ranges of text, globals/BSS for each object in a processes address space. Accordingly, at the time of capturing a system snapshot, such as in case of a system failure, the mapping is used to identify specific computer executable objects that contain sensitive information, and excluded from the captured system snapshot. The technical solutions further include techniques to create and/or modify a secure system snapshot configuration that specifies the types of data from different types of memory that may be excluded (or captured) in the system snapshot.

Accordingly, the technical solutions facilitate the operating system to classify, locate, and filter information in a user process address space based on metadata such as vendor, class and data type, so that the sensitive information can be excluded. The type of data to be excluded can be based on the area of the problem. Further, the technical solutions dynamically control the objects (such as classes) captured at core time, such that certain sensitive data is not captured in the system snapshot at all. The technical solutions may also be implemented to dynamically generate such a "limited snapshot" from a complete snapshot, based on the objects (classes) specified. Additionally, the technical solutions facilitate limiting the contents (and size) of the system snapshot file that is sent for further diagnosis, based on the problem area.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for generating a secured system snapshot of a system, the method comprising:
    receiving an instruction to load a computer executable object into a memory, the computer executable object being a data structure being used by a computer application being executed by a system;
    determining sensitivity of the computer executable object by comparing a metadata that is associated with the computer executable object with an object list that comprises a plurality of predetermined criteria for different types of computer executable objects having sensitive data, the predetermined criteria specifying configuration for one or more types of data to be excluded from a secured system snapshot;
    determining a corresponding configuration of the computer executable object in response to the metadata of the computer executable object matching configuration of one of a plurality of objects included in the predetermined list of sensitive data objects;
    loading the computer executable object into the memory according to the corresponding configuration, wherein loading the computer executable object comprises allocating a separate heap memory for the computer executable object in response to the corresponding configuration specifying that the heap memory of the computer executable object is to be excluded from the secured system snapshot;
    receiving an instruction to generate a system snapshot, wherein the system snapshot captures data from the computer executable object loaded in the memory;
    accessing metadata that is associated with the computer executable object from a mapping list, the mapping list comprising a respective path from which the computer executable object is loaded in the memory;
    capturing the secured system snapshot by:
        determining sensitivity of the computer executable object by comparing the path with the predetermined criteria associated with the computer executable object; and
        excluding a capture of sensitive data from the computer executable object into the system snapshot in response to the path of the computer executable object matching the predetermined criteria; and
    storing the secured system snapshot.

2. The method of claim 1, further comprising, capturing an entirety of data of the computer executable object into the system snapshot in response to the metadata of the computer executable object not matching the predetermined criteria.

3. The method of claim 1, wherein the secured system snapshot is captured in response to receipt of an instruction to generate the secured system snapshot, and wherein the method further comprises:
    capturing an insecure system snapshot, comprising an entirety of data of the computer executable object into the system snapshot in response to absence of the instruction to generate the secured system snapshot.

4. The method of claim 3, further comprising receiving the instruction to generate the secured system snapshot at startup of the system.

5. The method of claim 3, further comprising receiving the instruction to generate the secured system snapshot at startup of an application for execution by the system.

6. The method of claim 3, further comprising receiving the instruction to generate the secured system snapshot in response to a library being loaded into the memory, the library being invoked by an application being executed by the system.

7. The method of claim 1, wherein the corresponding configuration specifies that stack memory of the computer executable object is partially excluded from the secured system snapshot.

8. The method of claim 1, wherein the predetermined criteria comprises a storage-path of the computer application that caused the computer executable object to be loaded into the memory.

9. The method of claim 1, wherein the predetermined criteria comprises a user identifier associated with the computer application that caused the computer executable object to be loaded into the memory.

10. A computer program product for generating a secured system snapshot of a system, the computer program product comprising a computer readable storage medium, the computer readable storage medium comprising computer executable instructions, wherein the computer readable storage medium comprises instructions to:
    receive an instruction to load a computer executable object into a memory, the computer executable object being a data structure being used by a computer application being executed by a system;
    determine sensitivity of the computer executable object by comparing a metadata that is associated with the computer executable object with an object list that comprises a plurality of predetermined criteria for different types of computer executable objects having sensitive data, the predetermined criteria specifying configuration for one or more types of data to be excluded from a secured system snapshot;
    determine a corresponding configuration of the computer executable object in response to the metadata of the computer executable object matching configuration of one of a plurality of objects included in the predetermined list of sensitive data objects;
    load the computer executable object into the memory according to the corresponding configuration, wherein the instructions to load the computer executable object further comprise instructions to allocate a separate heap memory for the computer executable object in response to the corresponding configuration specifying that the heap memory of the computer executable object is to be excluded from the secured system snapshot;
    receive an instruction to generate a system snapshot, wherein the system snapshot captures data from the computer executable object loaded in the memory;
    access metadata that is associated with the computer executable object from a mapping list, the mapping list comprising respective path from which the computer executable object is loaded in the memory;
    capture the secured system snapshot by:
        determining sensitivity of the computer executable object by comparing the path with a predetermined criteria associated with the computer executable object; and
        excluding a capture of sensitive data from the computer executable object into the system snapshot in response to the path of the computer executable object matching the predetermined criteria; and
    store the secured system snapshot.

11. The computer program product of claim 10, wherein the computer readable storage medium further comprises instructions to capture an entirety of data of the computer executable object into the system snapshot in response to the metadata of the computer executable object not matching the predetermined criteria.

12. The computer program product of claim 10, wherein the secured system snapshot is captured in response to receipt of an instruction to generate the secured system snapshot, and wherein the computer readable storage medium further comprises instructions to capture a non-secure system snapshot, comprising an entirety of data of the computer executable object into the system snapshot in response to absence of the instruction to generate the secured system snapshot.

13. The computer program product of claim 10, wherein the predetermined criteria comprises a storage-path of the computer application that caused the computer executable object to be loaded into the memory.

14. The computer program product of claim 10, wherein the predetermined criteria comprises a user identifier associated with the computer application that caused the computer executable object to be loaded into the memory.

15. A system for generating a secured system snapshot of a system, the system comprising:
a memory; and
a processor communicatively coupled with the memory, the processor configured to execute an operating system that is configured to:
receive an instruction to load a computer executable object into a memory, the computer executable object being a data structure being used by a computer application being executed by a system;
determine sensitivity of the computer executable object by comparing a metadata that is associated with the computer executable object with an object list that comprises a plurality of predetermined criteria for different types of computer executable objects having sensitive data, the predetermined criteria specifying configuration for one or more types of data to be excluded from a secured system snapshot;
determine a corresponding configuration of the computer executable object in response to the metadata of the computer executable object matching configuration of one of a plurality of objects included in the predetermined list of sensitive data objects;
load the computer executable object into the memory according to the corresponding configuration, wherein loading the computer executable object comprises allocating a separate heap memory for the computer executable object in response to the corresponding configuration specifying that the heap memory of the computer executable object is to be excluded from the secured system snapshot;
receive an instruction to generate a system snapshot, wherein the system snapshot captures data from the computer executable object loaded in the memory;
access metadata that is associated with the computer executable object from a mapping list, the mapping list comprising respective path from which the computer executable object is loaded in the memory;
capture the secured system snapshot, wherein capturing comprises:
determining sensitivity of the computer executable object by comparing the path with the predetermined criteria associated with the computer executable object; and
excluding a capture of sensitive data from the computer executable object into the system snapshot in response to the path of the computer executable object matching the predetermined criteria; and
store the secured system snapshot.

16. The system of claim 15, wherein the secured system snapshot is captured in response to receipt of an instruction to generate the secured system snapshot, and wherein the operating system is further configured to capture a non-secure system snapshot, comprising an entirety of data of the computer executable object into the system snapshot in response to absence of the instruction to generate the secured system snapshot.

17. The system of claim 15, wherein the predetermined criteria comprises a storage-path of the computer application that caused the computer executable object to be loaded into the memory.

18. The system of claim 15, wherein the predetermined criteria comprises a user identifier associated with the computer application that caused the computer executable object to be loaded into the memory.

* * * * *